United States Patent [19]

Kumura et al.

[11] Patent Number: 5,019,189

[45] Date of Patent: May 28, 1991

[54] STEEL PIPE AND A METHOD FOR WELDING THEREOF AND PIPELINE RESISTANT TO CARBON DIOXIDE CORROSION

[75] Inventors: Mitsuo Kumura; Tatsufumi Uegaki, both of Chiba, Japan

[73] Assignee: Kawasaki Steel Corporation, Hyogo, Japan

[21] Appl. No.: 506,472

[22] Filed: Apr. 9, 1990

[30] Foreign Application Priority Data

Apr. 13, 1989 [JP] Japan .................................. 64-91894
Jun. 28, 1989 [JP] Japan .................................. 64-166170

[51] Int. Cl.$^5$ ....................... B21C 37/06; C22C 38/06
[52] U.S. Cl. ................................ 148/127; 148/12 R; 148/136; 148/154
[58] Field of Search ............... 148/127, 154, 136, 12 R

[56] References Cited

U.S. PATENT DOCUMENTS

| | | | |
|---|---|---|---|
| 3,997,374 | 12/1976 | Dill et al. | 148/127 |
| 4,189,333 | 2/1980 | Waid et al. | 148/127 |
| 4,464,209 | 8/1984 | Taira et al. | 148/127 |
| 4,710,245 | 12/1987 | Roether | 148/127 |
| 4,721,536 | 1/1988 | Grob et al. | 148/127 |

FOREIGN PATENT DOCUMENTS

| | | | |
|---|---|---|---|
| 0010219 | 1/1979 | Japan | 148/127 |
| 0241116 | 10/1988 | Japan | 148/127 |

Primary Examiner—Upendra Roy
Attorney, Agent, or Firm—Austin R. Miller

[57] ABSTRACT

A pipeline and steel pipe having superior resistance to carbon dioxide corrosion and suitable for transporting crude oil, natural gas and the like containing carbon dioxide. The pipeline includes in combination, pipe sections including a base metal having a composition containing not more than 0.25 wt % of C, from 0.01 to 0.50 wt % of Si; from 0.1 to 2.0 wt % of Mn; not more than 0.03 wt % of P; not more than 0.01 wt % of S; from 0.25 to 1.0 wt % of Cr; from 0.01 to 0.10 wt % of Al, and the balance substantially Fe and inevitable impurities, and a weld metal connecting the pipe sections together having a Cr content ranging from a value which is 0.2 wt % smaller than the Cr content of the base metal and a value which is 1.0 wt % greater than the Cr content of the base metal.

The method of the invention includes circumferential welding for connecting steel pipes together by gas-metal arc welding using a welding wire containing Cr and Ti in such amounts as to meet the condition of: Cr wt % $+3 \times$ Ti wt % $\leq 2.4$ wt % wherein, Cr wt % and Ti wt % respectively represent the contents of Cr and Ti of the welding wire in wt %.

5 Claims, 4 Drawing Sheets $C_{rw} - C_{rB} < -0.2$ $-0.2 \leqq C_{rw} - C_{rB} \leqq 1.0$ $C_{rw} - C_{rB} > 1.0$

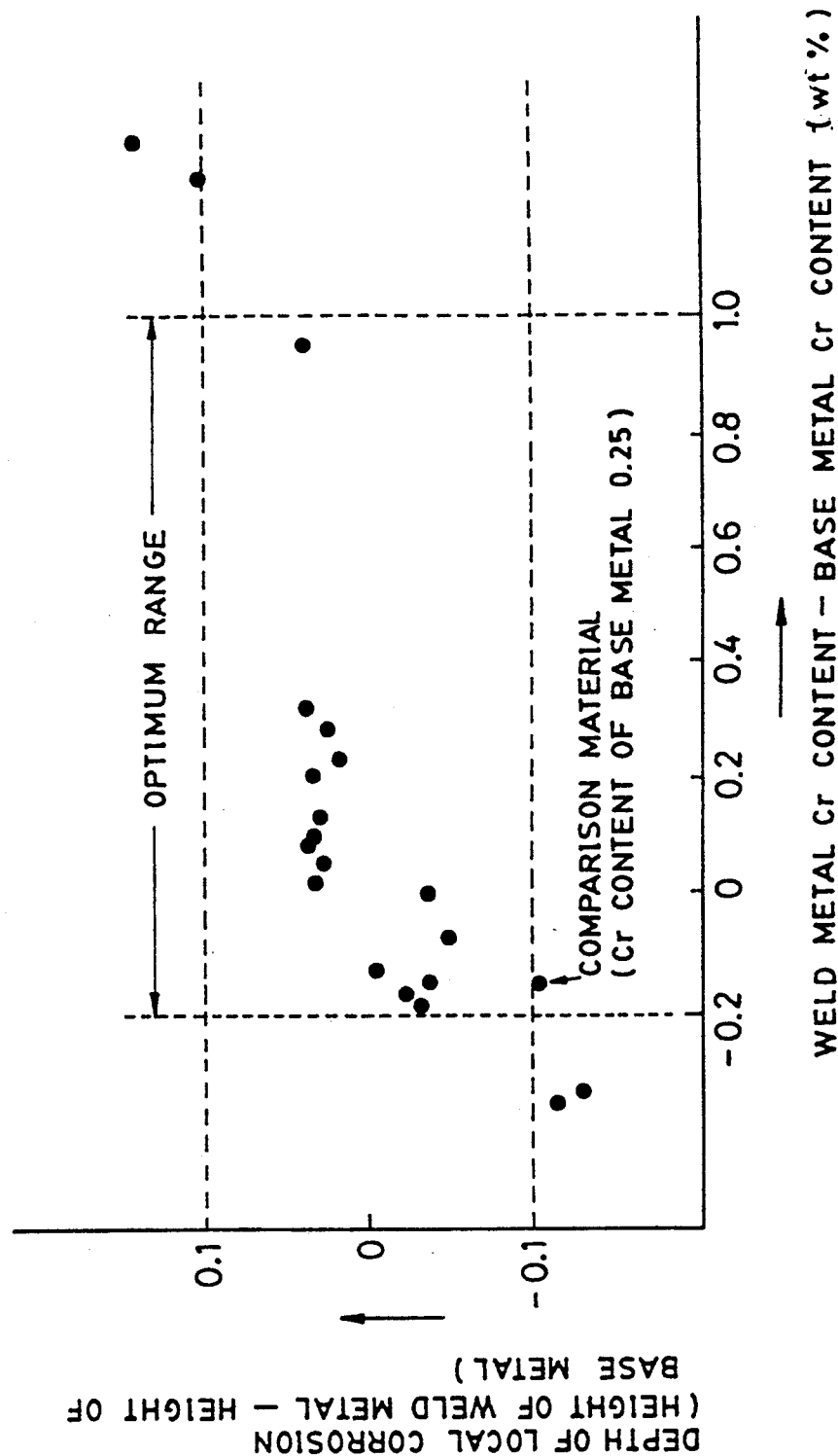

STEEL PIPE AND A METHOD FOR WELDING THEREOF AND PIPELINE RESISTANT TO CARBON DIOXIDE CORROSION

BACKGROUND OF THE INVENTION

1. Field of the Invention

The present invention relates to a pipeline suitable for use in transporting carbon dioxide containing materials such as crude oil, natural gas or the like, the pipeline having resistance to corrosion caused by the carbon dioxide. The present invention also relates to a steel pipe suitable for use in the pipeline, as well as to a circumferential welding method for constructing the pipeline with such steel pipe.

2. Description of the Related Art

It is a current measure to directly transport crude oil or natural gas through a pipeline from a submarine well or field to shore processing equipment where gas separation is conducted, rather than conducting gas separation in offshore equipment.

Since such crude oil or natural gas extracted from the submarine field contains carbon dioxide, the pipeline for transporting the oil or gas to the shore processing equipment tends to be corroded by carbon dioxide. Hitherto, therefore, an inhibitor which is mainly of the amine type, has been added to the material to be transported in order to prevent corrosion of the pipeline. Such an inhibitor, however, tends not to work satisfactorily at some local portions of the pipeline. In addition, no system has been established for dealing with troubles which are often caused in the system for injecting the inhibitor.

It is possible to suppress corrosion by using a corrosion resistant material as the material of the steel pipe of the pipeline. Such corrosion resistant metals, e.g., stainless steels or alloy steels, are prohibitively expensive, thereby not permitting use of such materials in long distance pipelines constructed by connecting large quantities of pipe pieces.

In general, resistance to corrosion caused by carbon dioxide can be improved by addition of chromium (Cr). Steel pipes for pipelines enriched in Cr are disclosed, for example, in Japanese Patent Unexamined Publication Nos. 54-124817, 56-93856 and 55-158253. These disclosures, however, relate only to the strength of the base metals of the steel pipes. No successful approach has been made heretofore to improve resistance to carbon dioxide corrosion in due consideration of the weld metal used for connecting such steel pipes. Troublesome problems of local corrosion at circumferential weld portions of steel pipeline also remain unsolved.

OBJECTS OF THE INVENTION

An object of the present invention is to provide a pipeline used for transporting materials containing carbon dioxide which is improved to exhibit higher resistance to corrosion caused by carbon dioxide over the entire inner surface of the pipeline.

Another object of the present invention is to provide a pipeline used for transporting materials containing carbon dioxide which is improved to exhibit higher resistance to corrosion caused by carbon dioxide at locally welded portions such as submerged-arc-welded seam weld portions and weld joint portions conducted by circumferential welding for connecting successive steel pipes.

The above and other objects, features and advantages of the present invention will become apparent from the following description of the preferred embodiments, the accompanying drawings and the appended claims.

SUMMARY OF THE INVENTION

To this end, according to aspects of the present invention, there is provided a pipeline and steel pipe sections having superior resistance to carbon dioxide corrosion, comprising: a base metal having a composition containing not more than 0.25 wt % of C, from 0.01 to 0.50 wt % of Si; from 0.1 to 2.0 wt % of Mn; not more than 0.03 wt % of P; not more than 0.01 wt % of S; from 0.25 to 1.0 wt % of Cr; from 0.01 to 0.10 wt % of Al, and the balance substantially Fe and inevitable impurities; and a weld metal having a Cr content ranging between a value which is 0.2 wt % smaller than the Cr content of said base metal and a value which is 1.0 wt % greater than the Cr content of said base metal.

BRIEF DESCRIPTION OF THE DRAWINGS

FIG. 3 is a graph showing the relationship between the depth of local corrosion and the difference between the Cr content of the weld metal and the Cr content of the base metal;

DETAILED DESCRIPTION OF THE INVENTION

Figure 1:
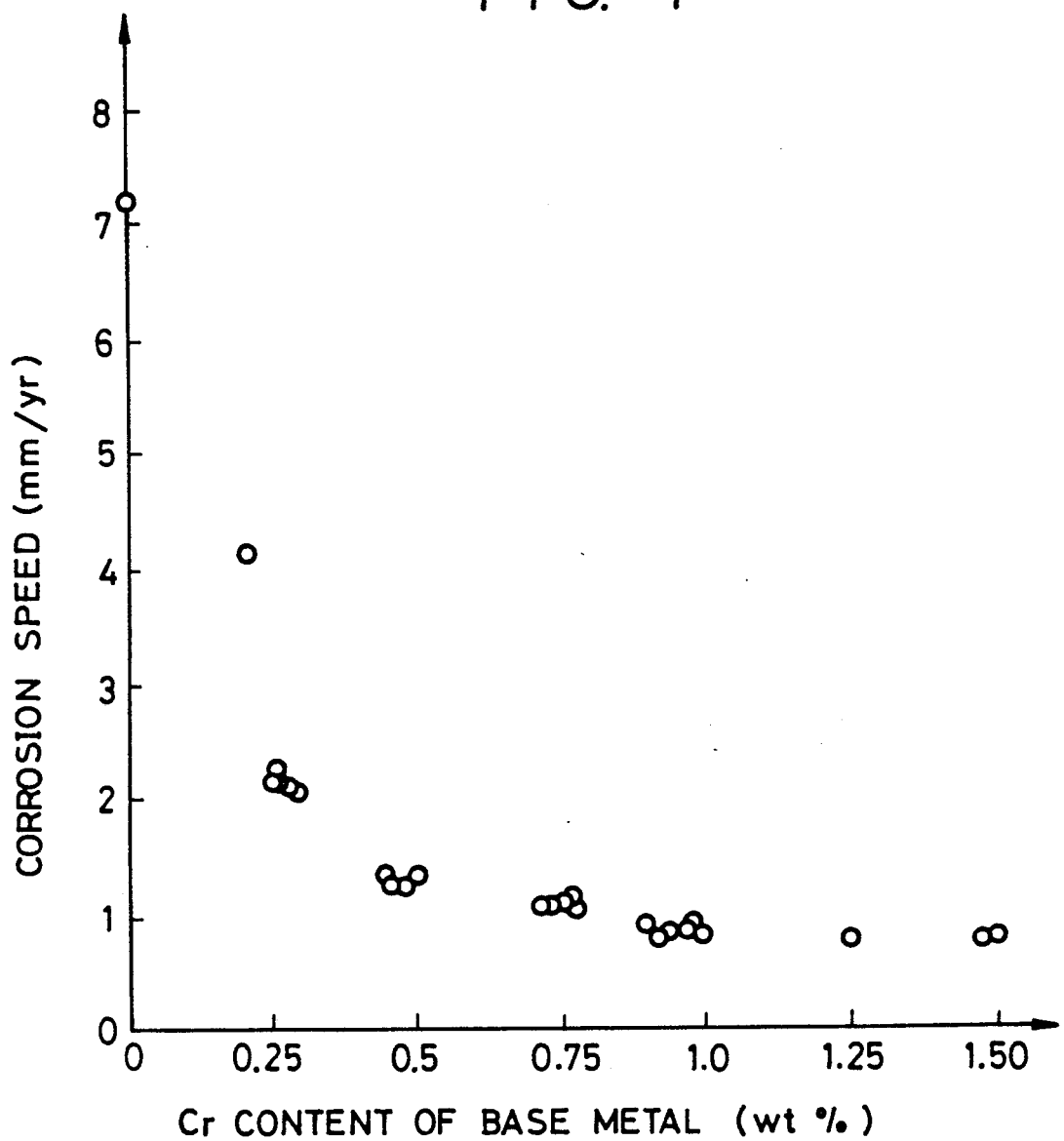
FIG. 1 is a graph showing the relationship between corrosion speed and Cr content of the base metal of an embodiment of the pipeline of the present invention.

Although particular forms of metals and apparatus have been selected for illustration in the drawings, and although specific terms will be used in the specification, for the sake of clarity in the invention herein, the scope of this invention is defined in the appended claims and is not intended to be limited by the drawings or graphs selected or the terms used in the specification.

One embodiment of the present invention provides a pipeline resistant to carbon-dioxide corrosion, comprising: a base metal having a composition containing not more than 0.25 wt % of C; from 0.01 to 0.50 wt % of Si; from 0.1 to 2.0 wt % of Mn; not more than 0.03 wt % of P; not more than 0.01 wt % of S; from 0.25 to 1.0 wt % of Cr; from 0.01 to 0.10 wt % of Al, and the balance substantially Fe and inevitable impurities; and a weld metal having a Cr content ranging between a value which is 0.2 wt % smaller than the Cr content of said base metal and a value which is 1.0 wt % greater than the Cr content of said base metal. A weld metal includes seam welded portions and weld joint portions conducted by circumferential welding for connecting successive steel pipes.

The reasons of limiting the contents of the respective components or elements will be described hereinafter.

C is an element which strengthens base metals. When the C content exceeds 0.25 wt %, the toughness of the weld portion is impaired. The C content is therefore selected to be not greater than 0.25 wt %.

Si is an element used for deoxidation. An Si content below 0.010 wt %, however, does not produce an appreciable deoxidation effect, whereas a Si content exceeding 0.50 wt % impairs toughness of the steel. The Si content is therefore selected to be from 0.01 wt % to 0.50 wt %.

Mn is an element used for obtaining a required strength of the steel. In order to obtain an appreciable strengthening effect, Mn content should be not smaller than 0.10 wt %. Mn, however, undesirably reduces toughness and weldability of base metals when its content exceeds 2.0 wt %. The Mn content, therefore, is determined to be from 0.1 wt % to 2.0 wt %.

P is a harmful impurity and undesirably promotes central segregation. The P content therefore is made small. In view of production costs, however, the P content is determined to be not greater than 0.03 wt %.

S impairs toughness and corrosion resistance so that its content is preferably made small. In view of production costs, however, the S content is determined to be not greater than 0.01 wt %.

Cr is an element which remarkably improves resistance to carbon-dioxide corrosion. The effect of addition of Cr is remarkable particularly when its content is 0.25 wt % or grater, but is substantially saturated when the content is increased beyond 1.0 wt %. Addition of Cr in excess of 1.0 wt %, on the other hand, causes a reduction in mechanical properties and weldability—in particular circumferential weldability of the steel. The Cr content, therefore, is selected to be from 0.25 wt % to 1.0 wt %. The relationship between the corrosion speed and the Cr content is shown in FIG. 1. As will be seen from this Figure, the corrosion speed is reduced to ¼ or below by addition of 0.25 wt % or more of Cr, as compared with steel which does not contain Cr. Cr is therefore added as an essential element to the base metal of the steel pipe used in the pipeline of the present invention.

Al is an element used for deoxidation. The effect of addition of Al, however, is not appreciable when the Al content is below 0.01%. On the other hand, Al content exceeding 0.10 wt % causes unfavorable effects such as degradation of the material due to coarsening of the crystal grains. The Al content is therefore determined to be from 0.01 wt % to 0.10 wt %.

Cu produces an effect to enhance strength and also improves corrosion resistance of the steel by forming a film in the presence of a trace amount of $H_2S$. Addition of Cu in excess of 0.5%, however, impairs resistance to carbon-dioxide corrosion. The Cu content is therefore selected to be not greater than 0.5 wt %.

Ni produces an effect to enhance strength as in the case of Cu. Ni also improves toughness. Addition of Ni in excess of 0.5 wt %, however, is uneconomical because the effect is substantially saturated. The Ni content is therefore selected to be not greater than 0.5 wt %.

Mo, Ti, Nb, V and B are elements which are effective to enhance strength. The Mo content, Ti content, Nb content, V content and B content are respectively determined to be not greater than 0.5 wt %, not greater than 0.2 wt %, not greater than 0.2 wt %, not greater than 0.2 wt % and not greater than 0.005 wt %, because these elements impair the toughness of the material when the upper limits of these contents are exceeded.

Zr and Ca are elements which are effective in the shape control of inclusions. Zr and Ca also produce an appreciable effect in preventing hydrogen induction cracking which tends to occur when a trace amount of $H_2S$ exists. The Zr content and the Ca content, however, are determined to be not greater than 0.20 wt % and not greater than 0.006 wt %, because addition of these elements in excess of these upper limit content values causes a reduction in the toughness of the base metal.

When a steel pipe is formed from this base metal by submerged arc welding, for example, the submerged weld metal should have a Cr content ranging between a value which is 0.2 wt % smaller than the Cr content of the base metal and a value which is 1.0 wt % greater than the same. When the Cr content of the submerged arc weld metal is more than 0.2 wt % smaller than the Cr content of the base metal, local corrosion typically occurs in the weld metal. When the Cr content of the weld metal is more than 1.0 wt % greater than the Cr content of the base metal, local corrosion take place in the heat affected zone.

The relationship between corrosion and the difference in the Cr content between the base metal and the weld metal will be described with reference to FIGS. 2A through 2C.

Figure 2A:
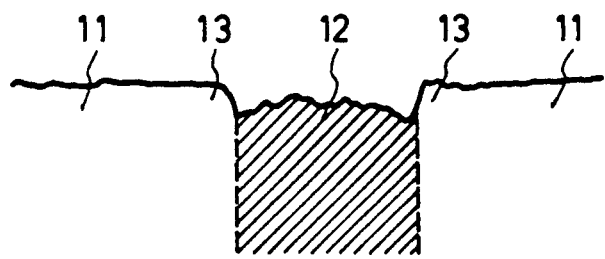
FIG. 2A is a schematic front elevational illustration of a section of base metal and a weld metal, wherein the weld metal has corroded more than the base metal.

FIG. 2A schematically shows the state of corrosion occurring in the vicinity of a weld region as observed when the Cr content $Cr_W$ of the weld metal is 0.1 wt % and the Cr content $Cr_B$ of the base metal is 0.5 wt %, respectively. In this case, the difference in the Cr content is given as $0.1 - 0.5 = -0.4 < -0.2$ (wt %). It will be seen that local corrosion occurs in weld metal 12, which is hatched in FIG. 2A.

Figure 2B:
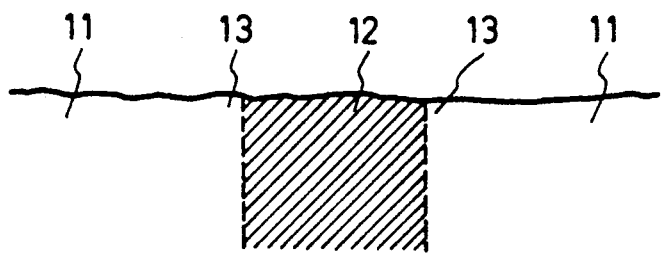
FIG. 2B is a schematic front elevational illustration of a section of base metal and a weld metal, wherein both the base metal and the weld metal have not substantially corroded.

FIG. 2B schematically shows the state of corrosion around the weld region as observed when the Cr content $Cr_W$ of the weld metal is 0.6 wt % and the Cr content $Cr_B$ of the base metal is 0.5 wt %, respectively. In this case, the difference in the Cr content is given as $0.6 - 0.5 = 0.1$ (wt %), thus satisfying the condition mentioned above. It will be seen that both weld metal 12 and base metal 11 are not corroded.

Figure 2C:
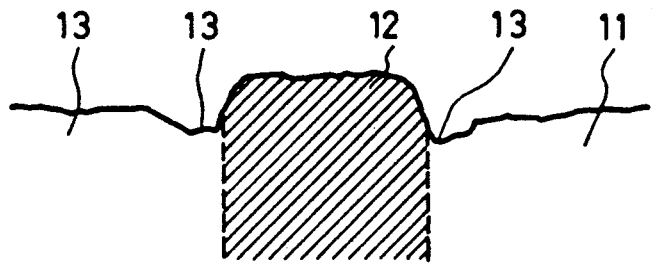
FIG. 2C is a schematic front elevational illustration of a section of base metal and a weld metal, wherein the base metal has corroded more than the weld metal.

FIG. 2C schematically shows the state of corrosion around the weld region as observed when the Cr content $Cr_W$ of the weld metal is 2.5 wt % and the Cr content $Cr_B$ of the base metal is 0.5 wt %, respectively. In this case, the difference in the Cr content is given as $2.5 - 0.5 = 2.0$ (wt %), thus exceeding the upper limit of the range specified above. It will be seen that local corrosion occurs in the heat affected zone 13.

The addition of Cr to the weld metal may be effected not only by using a welding wire having a required Cr content but also by using a Cr containing flux.

When the described steel pipes are welded to construct a pipeline, it is a common measure to conduct gas-metal arc welding at the site where the pipeline is to be placed.

Gas-metal arc welding is preferably conducted by using a gas-metal arc welding wire containing Cr and Ti. The Cr content and the Ti content of the welding wire should be selected to meet the following condition:

Cr content (wt %) + 3 × Ti content (wt %) ≦ 2.4 (wt %)

It is also necessary that the Cr content falls within the range specified above in relation to the Cr content of the base metal, and that welding is performed smoothly without defect.

As explained before, Cr contributes to an improvement in resistance to corrosion caused by carbon dioxide. Addition of an excessively large amount of Cr, however, increases the viscosity of the molten metal on the welding wire during welding. This causes impediments to the welding operation such as a reduction in the frequency of transfer of the weld metal to the base metal.

Ti is an element which provides a deoxidation effect as explained before, and improves the toughness of the weld metal. Too large a Ti content, however, impairs welding as does Cr.

The undesirable effect of Ti and Cr on welding characteristics becomes noticeable when the sum of the Cr content in terms of wt % and triple the Ti content in terms of wt % exceeds 2.4.

For these reasons, the Cr content and the Ti content are determined to meet the above-mentioned condition.

Thus, the pipeline of the present invention can be constructed by conducting gas-metal arc welding using steel pipes and welding wire having compositions which meet the conditions described hereinbefore.

EXAMPLES

Example 1

Cr containing steel plates were prepared by adding Cr to known steel compositions having various values of C contents, and submerged welding was conducted on steel plates with welding wires having various Cr content values. The tested steel plates had a thickness of 16 mm and the submerged welding was conducted with welding heat inputs of 32.0 K.Joule/cm. Chemical compositions of the tested steel plates, Cr contents of welding wires and Cr content of the weld metals are shown in Table 2. Table 3 shows mechanical properties of the tested materials. The Cr containing steels used in the present invention have mechanical properties substantially equivalent to those of known steels.

Figure 4:
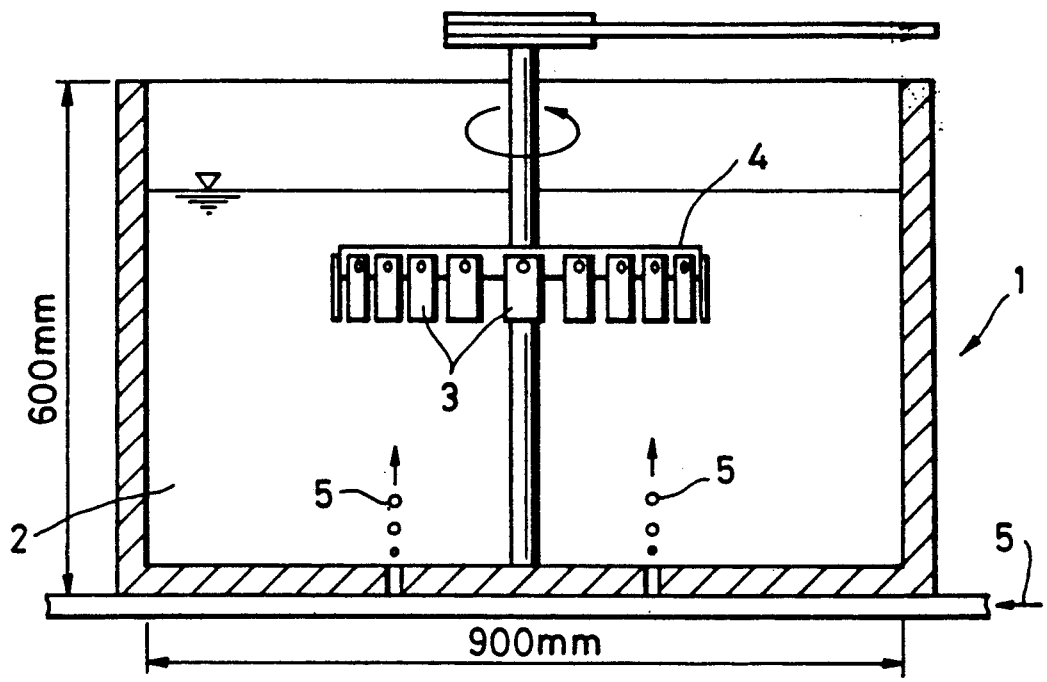
FIG. 4 is a schematic illustration of a $CO_2$ corrosion tester used in an embodiment of the present invention.
Figure 5:
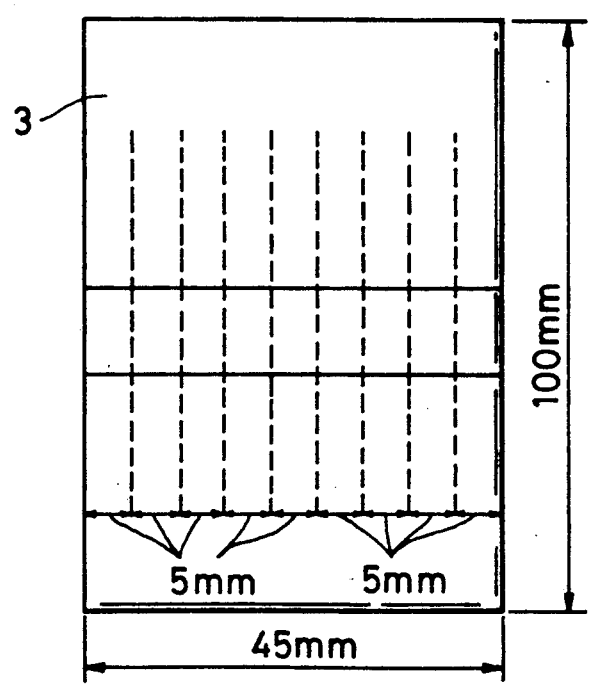
FIG. 5 is an illustration of a method for obtaining test pieces from an embodiment of the present invention.

A carbon dioxide corrosion test was conducted by using the rotary dipping testing apparatus shown in FIG. 4. Each sample to be tested was attached to a jig and dipped in a 50° C. aqueous solution containing 0.1 wt % of NaCl into which carbon dioxide gas was supplied at a rate of 1l or greater per minute, while the sample was rotated to create a relative flow velocity of 1 m/sec. The corrosion speed was measured by measuring the amount of corrosion occurring after continuation of the test for 4 weeks. For the purpose of examination of the state of corrosion, samples after the test were slit into strips as shown in FIG. 5 to enable observation of 8 cross-sectional surfaces. The results of our examination are also shown in Table 3. The examination results shown in Table 3 are plotted in FIG. 3.

When the Cr content of the weld metal was decreased beyond a value which is 0.2 wt % smaller than that of the base metal, the weld metal corroded more heavily than the base metal. Namely, a local corrosion of 0.1 mm or more in terms of depth occurred in the weld metal. Conversely, when the Cr content of the weld metal was increased beyond a value which is 1% greater than that of the base metal, heavy corrosion took place in the base metal, particularly in the heat affected zone. Thus, heavy corrosion of 0.1 mm or greater in terms of depth occurred in the base metal.

As a result of the test, it was confirmed that the samples prepared in accordance with the present invention are superior both in resistance to overall surface corrosion and resistance to local corrosion. It is therefore understood that a pipeline having superior resistance to carbon-dioxide corrosion is obtainable with the steel pipes produced in accordance with the present invention.

Example 2

Using a welding wire of 1.2 mm diameter (Cr content 0.75 wt %, Ti content 0.10 wt %), a 10 pass multi-layer welding was conducted on 16 mm thick steel samples containing 0.14 wt % of C, 0.23 wt % of Si, 0.85 wt % of Mn, 0.022 wt % of P, 0.0032 wt % of S, 0.28 wt % of Cr, 0.026 wt % of Al, 0.22 wt % of Cu and 0.16 wt % of Ni. (Corresponds to number "4" in Table 2.) The welding heat input of each pass was between 3.0K.Joule/cm and 15.0K.Joule/cm. The welding condition is shown in Table 1.

TABLE 1

| | Welding current | Welding voltage | Welding speed | Shield gas | |
|---|---|---|---|---|---|
| 1st pass | 350 A | 28 V | 200 cm/min | Ar: | 75% |
| | | | | $CO_2$: | 25% |
| 2nd–9th passes | 350 A | 28 V | 100 cm/min | $CO_2$: | 100% |
| 10th pass | 350 A | 28 V | 40 cm/min | $CO_2$: | 100% |

Samples were cut out from the welded parts and were subjected to a carbon dioxide corrosion test conducted in the same manner as Example 1.

As a result of the test, it was confirmed that the corrosion speed was as small as 2.13 mm per year, while the depth of local corrosion of the base metal was +0,030 mm which is much smaller than 0.1 mm. The welding operation characteristics were also found to be excellent.

The weld metal used in Example 2 had a Cr content of 0.36 wt %. The difference in the Cr content between the weld metal and the base metal, i.e., the value obtained by subtracting the Cr content of the base metal from the Cr content of the weld metal was +0.08 wt %, thus fulfilling the condition of between −0.2 wt % and +1.0 wt %. The Cr content and the Ti content of the welding wire also satisfied the condition of Cr+3Ti≦2.4, since the parameter is calculated as 0.75+3×0.10=1.05.

As will be understood from the foregoing description, according to the present invention, it is possible to construct a durable pipeline capable of transporting a carbon dioxide containing gas or fluid with reduced overall and local corrosion, efficiently and without defect by circumferential welding.

As will further be understood from the corrosion test results shown in Table 3, and especially with regard to the comparison examples numbers 17–22, compositions falling outside of the scope of the present invention exhibit high corrosion speeds and/or excessive local corrosion depths. Such corrosion characteristics render the steel pipe unusable for pipeline use when exposed to carbon dioxide containing gas or fluid.

Although this invention has been described in connection with specific terms herein, it will be appreciated that a wide array of equivalents may be substituted without departing from the spirit and scope of this invention as described in the appended claims.

TABLE 2

| | | (wt %) | | | | | | | | |
|---|---|---|---|---|---|---|---|---|---|---|
| | | C | Si | Mn | P | S | Cr | Al | Cu | Ni | Mo |
| Steels according to the invention | 1 | 0.15 | 0.24 | 0.80 | 0.013 | 0.0029 | 0.25 | 0.027 | | | |
| | 2 | 0.14 | 0.24 | 0.83 | 0.021 | 0.0032 | 0.29 | 0.030 | 0.20 | | |
| | 3 | 0.14 | 0.26 | 0.83 | 0.025 | 0.0030 | 0.26 | 0.029 | | 0.15 | |
| | 4 | 0.14 | 0.23 | 0.85 | 0.022 | 0.0032 | 0.28 | 0.026 | 0.22 | 0.16 | |
| | 5 | 0.15 | 0.27 | 0.77 | 0.023 | 0.0035 | 0.25 | 0.037 | | | |
| | 6 | 0.12 | 0.23 | 0.97 | 0.017 | 0.0035 | 0.50 | 0.040 | | | |
| | 7 | 0.12 | 0.25 | 1.02 | 0.019 | 0.0033 | 0.48 | 0.034 | | | |
| | 8 | 0.08 | 0.24 | 1.20 | 0.016 | 0.0041 | 0.97 | 0.035 | | | |
| | 9 | 0.07 | 0.28 | 1.19 | 0.017 | 0.0037 | 1.00 | 0.034 | | | 0.10 |
| | 10 | 0.07 | 0.30 | 1.16 | 0.023 | 0.0035 | 0.98 | 0.033 | 0.15 | 0.10 | |
| | 11 | 0.07 | 0.25 | 1.11 | 0.023 | 0.0040 | 0.92 | 0.028 | 0.13 | | |
| | 12 | 0.08 | 0.24 | 1.20 | 0.019 | 0.0031 | 0.93 | 0.029 | | 0.15 | |
| | 13 | 0.08 | 0.24 | 1.15 | 0.018 | 0.0034 | 0.90 | 0.033 | 0.15 | | |
| | 14 | 0.05 | 0.22 | 1.37 | 0.019 | 0.0030 | 0.75 | 0.033 | | 0.14 | |
| | 15 | 0.04 | 0.25 | 1.46 | 0.018 | 0.0031 | 0.77 | 0.041 | 0.12 | 0.07 | 0.05 |
| | 16 | 0.04 | 0.27 | 1.51 | 0.019 | 0.0033 | 0.72 | 0.037 | 0.10 | 0.09 | 0.05 |
| Comparison examples | 17 | 0.16 | 0.29 | 0.85 | 0.027 | 0.0033 | — | 0.038 | | | |
| | 18 | 0.14 | 0.22 | 0.84 | 0.028 | 0.0029 | 0.20 | 0.029 | | | |
| | 19 | 0.15 | 0.26 | 0.82 | 0.022 | 0.0036 | 0.46 | 0.035 | 0.16 | 0.11 | |
| | 20 | 0.07 | 0.24 | 1.16 | 0.026 | 0.0041 | 0.45 | 0.038 | | | |
| | 21 | 0.08 | 0.28 | 1.23 | 0.020 | 0.0021 | 0.77 | 0.031 | | | 0.09 |
| | 22 | 0.07 | 0.30 | 1.14 | 0.015 | 0.0033 | 0.74 | 0.035 | 0.09 | 0.07 | |

| | | (wt %) | | | | | | | Cr content of wire |
|---|---|---|---|---|---|---|---|---|---|
| | | Ti | Nb | V | Zr | B | Ca | Cr* | |
| Steels according to the invention | 1 | | | | | | | 0.35 (+0.1) | 0.40 |
| | 2 | | | | | | | 0.37 (+0.08) | 0.40 |
| | 3 | | | | | | | 0.19 (−0.07) | 0.07 |
| | 4 | | | | | | | 0.30 (+0.02) | 0.31 |
| | 5 | | 0.030 | | | | | 0.56 (+0.31) | 0.65 |
| | 6 | 0.015 | 0.022 | | | 0.0020 | | 0.35 (−0.15) | 0.31 |
| | 7 | | 0.019 | | | | 0.0030 | 0.61 (+0.13) | 0.65 |
| | 8 | | | | 0.012 | | | 0.78 (−0.19) | 0.65 |
| | 9 | | 0.015 | 0.012 | | | | 1.27 (+0.27) | 1.60 |
| | 10 | | 0.027 | 0.010 | | | 0.0025 | 1.91 (+0.93) | 2.14 |
| | 11 | | 0.027 | | | | | 0.97 (+0.05) | 1.01 |
| | 12 | | 0.018 | 0.012 | | | | 0.80 (−0.13) | 0.65 |
| | 13 | 0.025 | | | 0.011 | | | 1.13 (+0.23) | 1.60 |
| | 14 | | 0.024 | | | | 0.0030 | 0.58 (−0.17) | 0.31 |
| | 15 | 0.011 | | | | 0.0010 | | 0.97 (+0.20) | 1.60 |
| | 16 | 0.009 | 0.012 | 0.005 | 0.007 | 0.0005 | 0.0032 | 1.00 (+0.28) | 1.60 |
| Comparison examples | 17 | | | | | | | — | — |
| | 18 | | 0.031 | 0.020 | | | | 0.05 (−0.15) | — |
| | 19 | | 0.024 | | | | 0.0035 | 0.13 (−0.33) | — |
| | 20 | 0.018 | | | | 0.0012 | | 1.72 (+1.27) | 2.14 |
| | 21 | | | 0.010 | | | | 0.42 (−0.35) | — |
| | 22 | | 0.020 | 0.015 | | | 0.0026 | 1.95 (+1.21) | 2.35 |

Cr* represents Cr content of weld metal.
Values in ( ) shows difference in Cr content ((Cr content of weld metal) − (Cr content of base metal))

TABLE 3

| | | Mechanical properties | | | Results of CO$_2$ corrosion test | |
|---|---|---|---|---|---|---|
| | | TS (kg/mm$^2$) | TS (kg/mm$^2$) | EL (%) | Corrosion speed (mm/year) | *Local corrosion depth (mm) |
| Steels according to the Invention | 1 | 55.2 | 63.4 | 27.9 | 2.15 | 0.032 |
| | 2 | 55.9 | 61.3 | 26.4 | 2.08 | 0.034 |
| | 3 | 54.5 | 63.7 | 29.7 | 2.17 | −0.046 |
| | 4 | 53.4 | 63.2 | 30.2 | 2.12 | 0.030 |
| | 5 | 52.8 | 63.0 | 28.6 | 2.26 | 0.037 |
| | 6 | 51.9 | 61.8 | 30.4 | 1.32 | −0.036 |
| | 7 | 52.3 | 62.9 | 29.9 | 1.24 | 0.029 |
| | 8 | 52.2 | 61.7 | 30.1 | 0.85 | −0.030 |
| | 9 | 52.4 | 63.9 | 31.7 | 0.82 | 0.026 |
| | 10 | 53.1 | 62.8 | 28.7 | 0.91 | 0.041 |
| | 11 | 53.5 | 63.2 | 29.4 | 0.77 | 0.026 |
| | 12 | 53.0 | 61.2 | 31.1 | 0.79 | −0.005 |
| | 13 | 51.2 | 63.5 | 32.6 | 0.90 | 0.018 |
| | 14 | 49.7 | 63.4 | 33.0 | 1.12 | −0.022 |
| | 15 | 47.3 | 60.2 | 31.5 | 1.07 | 0.033 |
| | 16 | 48.8 | 61.0 | 30.9 | 1.08 | 0.025 |
| Comparison example | 17 | 55.1 | 62.4 | 29.4 | 7.22 | −0.034 |
| | 18 | 53.4 | 60.3 | 25.9 | 4.14 | −0.102 |
| | 19 | 54.7 | 61.0 | 27.3 | 1.25 | −0.127 |
| | 20 | 53.1 | 63.5 | 29.7 | 1.30 | 0.146 |
| | 21 | 51.2 | 61.1 | 30.9 | 1.14 | −0.113 |
| | 22 | 52.2 | 59.7 | 28.3 | 1.10 | 0.106 |

*Minus (−) sign of local corrosion depth means corrosion is in weld metal.
Plus (+) sign of local corrosion depth means corrosion is in base metal.

We claim:

1. A welded pipeline having superior resistance to carbon dioxide corrosion, comprising: at least two pipe sections each of which comprises a base metal having a composition containing not more than 0.25 wt % of C, from 0.01 to 0.50 wt % of Si; from 0.1 to 2.0 wt % of Mn; not more than 0.03 wt % of P; not more than 0.01 wt % of S; from 0.25 to 1.0 wt % of Cr; from 0.01 to 0.10 wt % of Al, and the balance substantially Fe and impurities; and a welded joint connecting said pipe sections and comprising a weld metal connecting said pipe sections together, said welded joint having a Cr content ranging between a value which is 0.2 wt % based on the total weight of the base metal smaller than the Cr content of said base metal based on the total weight of the base metal and a value which is 1.0 wt %, based on the total weight of the base metal greater than the Cr content of said base metal based on the total weight of the base metal.

2. A pipeline having superior resistance to carbon dioxide corrosion according to claim 1, wherein said base metal further contains one, two or more elements selected from the group consisting of not more than 0.5 wt % of Cu, not more than 0.5 wt % of Ni, not more than 0.5 wt % of Mo, not more than 0.2 wt % of Ti, not more than 0.2 wt % of Nb, not more than 0.2 wt % of V, not more than 0.05 wt % of B, not more than 0.2 wt % of Zr and not more than 0.006 wt % of Ca.

3. Steel pipe for pipelines having superior resistance to carbon dioxide corrosion, said steel pipe comprising: a base metal having a composition containing not more than 0.25 wt % of C, from 0.01 to 0.50 wt % of Si; from 0.1 to 2.0 wt % of Mn; not more than 0.03 wt % of P; not more than 0.01 wt % of S; from 0.25 to 1.0 wt % of Cr; from 0.01 to 0.10 wt % of Al, and the balance substantially Fe and inevitable impurities; and a weld metal having a Cr content ranging between a value which is 0.2 wt % smaller than the Cr content of said base metal and a value which is 1.0 wt % greater than the Cr content of said base metal.

4. Steel pipe for pipelines having superior resistance to carbon-dioxide corrosion according to claim 3, wherein said base metal further contains one, two or more elements selected from the group consisting of not more than 0.5 wt % of Cu, not more than 0.5 wt % of Ni, not more than 0.5 wt % of Mo, not more than 0.2 wt % of Ti, not more than 0.2 wt % of Nb, not more than 0.2 wt % of V, not more than 0.05 wt % of B, not more than 0.2 wt % of Zr and not more than 0.006 wt % of Ca.

5. A circumferential welding method for connecting a plurality of said steel pipes set forth in any one of claims 3 and 4, characterized in that the welding is conducted by gas-metal arc welding employing a welding wire containing Cr and Ti in such amounts as to meet the condition of:

$$Cr\ wt\ \% + 3 \times Ti\ wt\ \% \leqq 2.4\ wt\ \%$$

where, Cr wt % and Ti wt % respectively represent the contents of Cr and Ti based on the total weight of said welding wire in wt %.

* * * * *